(12) United States Patent
Baker

(10) Patent No.: US 8,436,939 B2
(45) Date of Patent: May 7, 2013

(54) AV DELAY MEASUREMENT AND CORRECTION VIA SIGNATURE CURVES

(75) Inventor: Daniel G. Baker, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 177 days.

(21) Appl. No.: 12/892,836

(22) Filed: Sep. 28, 2010

(65) Prior Publication Data
US 2011/0096173 A1 Apr. 28, 2011

Related U.S. Application Data

(60) Provisional application No. 61/254,733, filed on Oct. 25, 2009.

(51) Int. Cl.
*H04N 9/475* (2006.01)
(52) U.S. Cl.
USPC ............................ 348/515; 348/512; 348/518
(58) Field of Classification Search .................. 348/515, 348/500, 512–513, 423.1, 473, 461, 462, 348/518–519, 476, 478; *H04N 9/475*
See application file for complete search history.

(56) References Cited

U.S. PATENT DOCUMENTS

| | | | |
|---|---|---|---|
| 6,246,439 B1 * | 6/2001 | Zink et al. ..................... | 348/473 |
| 6,480,902 B1 * | 11/2002 | Yuang et al. .................. | 709/248 |
| 6,751,360 B1 | 6/2004 | Lu | |
| 6,836,295 B1 * | 12/2004 | Cooper .......................... | 348/515 |
| 7,212,248 B2 * | 5/2007 | Stanger ......................... | 348/515 |
| 2011/0261257 A1 * | 10/2011 | Terry et al. ..................... | 348/515 |

OTHER PUBLICATIONS

Radhakrishnan, Regunathan et al., "Audio and Video Signatures for Synchronization," Proceedings of ICME 2008, Jun. 5, 2008, pp. 1549-1552.

* cited by examiner

*Primary Examiner* — Trang U Tran
(74) *Attorney, Agent, or Firm* — Matthew D. Rabdau; Michael A. Nelson

(57) ABSTRACT

Embodiments of the present invention provide systems and methods for non-invasive, "in-service" AV delay detection and correction. These systems and methods do not modify the audio signal or the video signal, nor do they rely on any metadata to be carried with the audio signal or the video signal via the distribution path. Instead, agents located at various points along the distribution path generate very small signature curves for the audio signal and the video signal and distribute them to a manager via a separate data path other than the distribution path. The manager calculates a measured AV delay caused by the distribution path based on these signature curves, and then optionally corrects the measured AV delay by adjusting an in-line delay in the distribution path.

8 Claims, 7 Drawing Sheets

AV DELAY MEASUREMENT AND CORRECTION VIA SIGNATURE CURVES

CROSS-REFERENCE TO RELATED APPLICATIONS

This application claims the benefit of U.S. Provisional Patent Application No. 61/254,733 titled "AV Delay Measurement and Correction via Signature Curves" which was filed on Oct. 25, 2009.

FIELD OF THE INVENTION

The present invention relates to video test and measurement instruments, and more particularly to the measurement and correction of audio/video (AV) delay.

BACKGROUND OF THE INVENTION

The distribution, or streaming, of program audio and video in analog, digital, or compressed data over satellite and other terrestrial distribution paths can cause a timing or delay skew of the audio signal relative to the video signal creating the well known "lip-sync" problem. The causes are varied but generally occur when the audio is processed separately from the video with different processing or distribution delays. For example, the video may be sent over a satellite path and the audio over a lower-delay terrestrial path creating the need to re-sync the audio and video at some common destination point. Also separate coding and decoding (CODEC) delays of compressed multi-channel audio along with video creates the need to re-sync the audio relative to the video.

In many cases the multi-channel program audio associated with a program video signal has the correct timing relationship at some origination point and it is desired to re-create that relationship by delaying the audio or video at the destination point to correct for the different propagation or CODEC delays. This can be done "out-of-service" by inserting an audio tone burst or equivalent for the program audio at the origination point that is synchronous with a video flash, rotating wheel, electronic clap-board, or equivalent such that the AV delay can be measured and corrected at the destination point.

However, this approach has two major disadvantages. Firstly, it requires taking the normal program audio and video out-of-service for the test. Secondly, the AV processing delay may change over time due to CODEC variation and routing changes making the out-of-service correction value measured no longer valid.

U.S. Pat. No. 6,246,439 titled "Transparent embedment of data in a video signal" ("the '439 patent") describes a different approach in which an invisible watermark or some other metadata path is added to the video signal in order to send an audio envelope "signature curve" to the decoder for measurement and correction. In this manner, audio and video can be continuously adjusted into synchronization. This approach was used in the AVDC100 Audio-to-Video Delay Corrector (now discontinued) available from Tektronix, Inc. of Beaverton, Oreg. However, watermarking of the video signal is sometimes not acceptable and the watermark may not be detectable after video effects and scaling.

Alternatively, a video signature curve could be embedded into the audio channel as metadata or via an audio watermark in some form in order to measure and correct the AV delay in the same way as the '439 patent. However, the audio signal watermark modification may not be acceptable and the metadata path is often not preserved across the distribution chain.

What is desired is a method of measuring and correcting AV delay that overcomes the deficiencies of these previous approaches.

SUMMARY OF THE INVENTION

Accordingly, embodiments of the present invention provide systems and methods for non-invasive, "in-service" AV delay detection and correction. These systems and methods do not modify the audio signal or the video signal, nor do they rely on any metadata to be carried with the audio signal or the video signal via the distribution path. Instead, agents located at various points along the distribution path generate very small signature curves for the audio signal and the video signal and distribute them to a manager via a separate data path other than the distribution path. The manager calculates a measured AV delay caused by the distribution path based on these signature curves, and then optionally corrects the measured AV delay by adjusting an in-line delay in the distribution path.

The objects, advantages, and other novel features of the present invention are apparent from the following detailed description when read in conjunction with the appended claims and attached drawings.

DETAILED DESCRIPTION OF THE INVENTION

Figure 1:
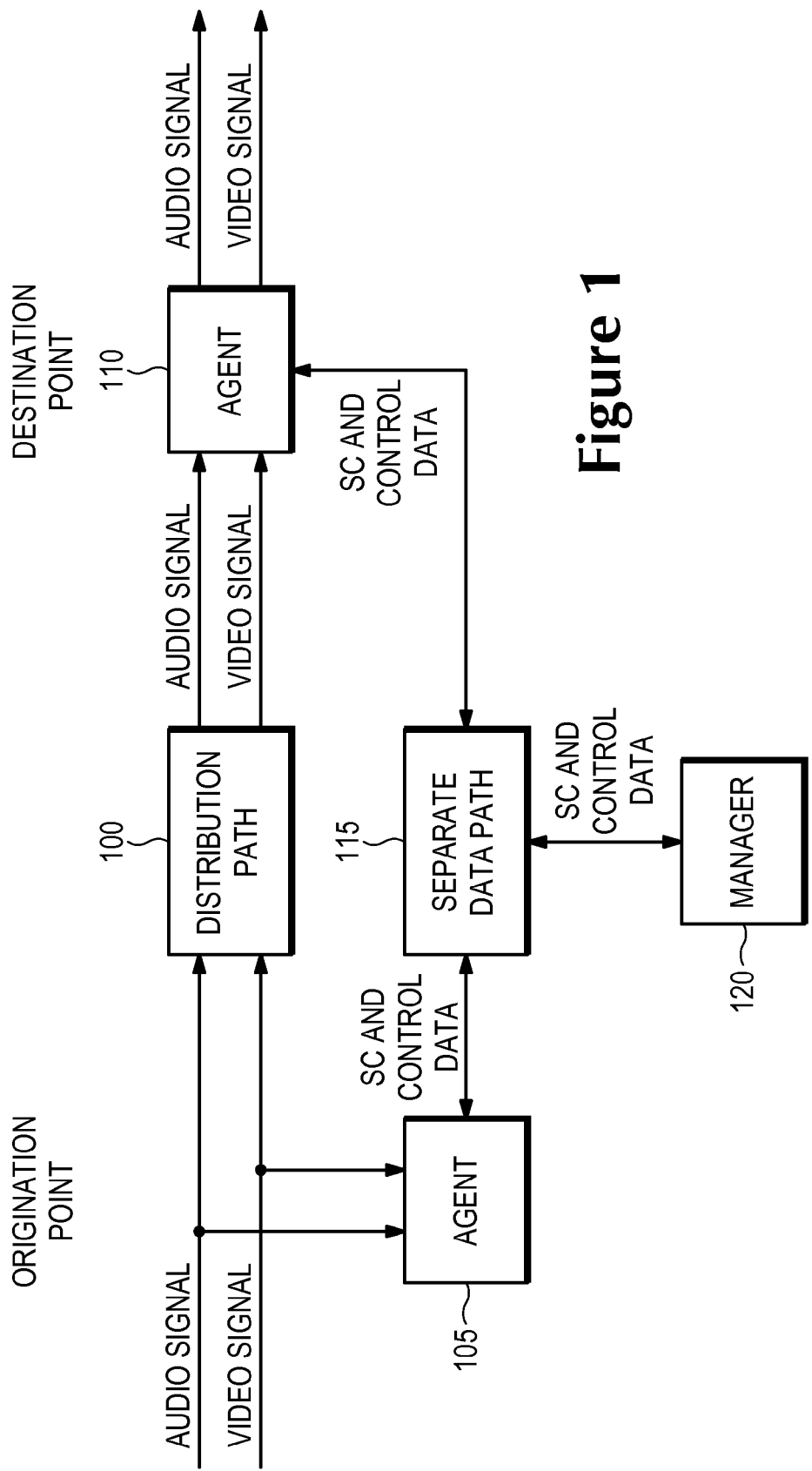
FIG. 1 depicts a first embodiment of a system and method of measuring and correcting AV delay according to the present invention.

FIG. 1 illustrates a first embodiment of a system and method for measuring and correcting AV delay according to the present invention. An AV program consists of an audio signal and a video signal. A first device 105 referred to as an "agent," located at an origination point, receives the AV program at an input, which in various embodiments may comprise an audio/video compression coder input or the like. The agent 105 then processes the audio signal to produce an audio signature curve (ASCo) and processes the video signal to produce a video signature curve (VSCo) using a processor (not shown). The AV program is then distributed from the origination point to a destination point via a distribution path 100. A second device 110 located at the destination point, also referred to as an "agent," receives the AV program and generates an audio signature curve (ASCr) based on the received audio signal and a video signature curve (VSCr) based on the received video signal. Optionally, the second agent 110 has a built-in, adjustable, in-line program audio and/or video delay (not shown).

A third device 120 referred to as a "manager" (1) collects the ASCo, VSCo, ASCr, and VSCr from the agents 105 and 110 via a separate data path 115, (2) calculates a measured AV delay of the AV program caused by the distribution path 100 based on the ASCo, VSCo, ASCr, and VSCr, and (3) optionally corrects the measured AV delay by adjusting the in-line delay of the agent 110 via the separate data path 115. The separate data path 115 is any data path other than the distribution path 100. For example, in various embodiments, the separate data path 115 may be a distributed network such as the Internet, a private network, or a dedicated data path. The agents 105 and 110 and the manager 120 have communication terminals (i.e., inputs and outputs) that are appropriate for communicating via the separate data path 115. For example, in the embodiment where the separate data path 115 is the Internet, the agents 105 and 110 and manager 120 may each have an Internet Protocol (IP) terminal. In some embodiments, the manager 120 is implemented as a software application running on a remote personal computer.

A signature curve (SC) is a very simple, compact data set, much smaller than the actual audio or video data set upon which it is based. Thus, an SC can be generated, distributed, and processed very quickly, allowing for real-time AV delay measurement and correction. A key characteristic of an SC for the purposes of the present invention is that it is compact, yet includes enough of the temporal characteristics of the audio or video to facilitate temporal alignment to the desired timing resolution. The generation and processing of SCs with this key characteristic are described in detail below.

In some embodiments, the agents 105 and 110 are incorporated in a video test and measurement device such as a WFM8000 series waveform monitor available from Tektronix, Inc. of Beaverton, Oreg. In other embodiments, the agents 105 and 110 are dedicated, stand-alone devices used for monitoring the program audio and video.

In some embodiments, particularly when the separate data path 115 is a distributed network such as the Internet, the manager 120 and the agents 105 and 110 may communicate via a protocol such as Simple Network Management Protocol (SNMP). In those embodiments, the manager 120 may be implemented as an "SNMP manager" and the agents 105 and 110 may be may be implemented as "SNMP agents." It will be appreciated that any other communication protocol may also be used.

Figure 2:
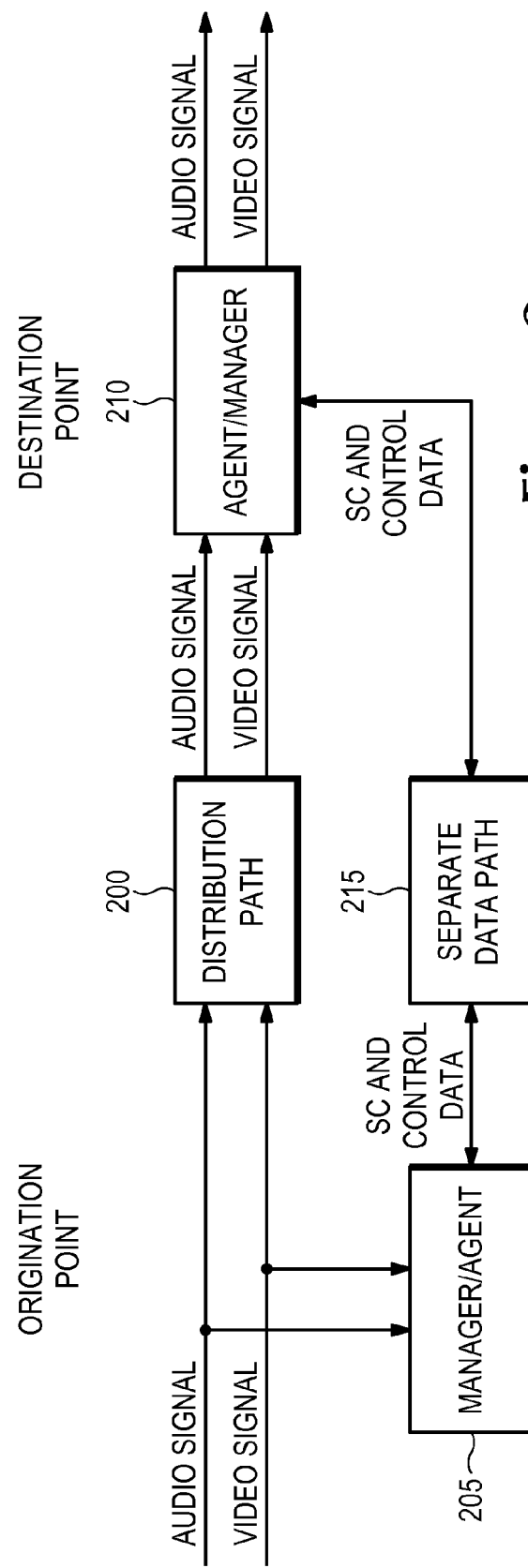
FIG. 2 depicts a second embodiment of a system and method for measuring and correcting AV delay according to the present invention.

FIG. 2 illustrates a second embodiment of a system and method for measuring and correcting AV delay according to the present invention. As in FIG. 1, an AV program consists of an audio signal and a video signal. A first device 205 located at an origination point generates an audio signature curve (ASCo) based on the audio signal and a video signature curve (VSCo) based on the video signal. The audio signal and the video signal are then distributed from the origination point to a destination point via a distribution path 200. A second device 210 located at the destination point generates an audio signature curve (ASCr) based on the received audio signal and a video signature curve (VSCr) based on the received video signal. Optionally, the second device 210 has a built-in, adjustable in-line program audio and/or video delay (not shown). However, unlike in FIG. 1, there is no third device that acts as a manager. Instead, one of the devices 205 or 210 serves as both an agent and a manager.

In embodiments where the first device 205 serves as both a manager and an agent, the first device 205 (1) collects the ASCr and VSCr from the second device 210, (2) calculates a measured AV delay of the AV program caused by the distribution path 200 based on the ASCo, VSCo, ASCr, and VSCr, and (3) optionally corrects the measured AV delay by adjusting the in-line delay of the second device 210. In embodiments where the second device 210 serves as both a manager and an agent, the second device 210 (1) collects the ASCo and VSCo from the first device 205, (2) calculates a measured AV delay of the AV program caused by the distribution path 200 based on the ASCo, VSCo, ASCr, and VSCr, and (3) optionally corrects the measured AV delay by adjusting the in-line delay of the second device 210. In some embodiments, the first device 205 and the second device 210 may change roles, acting either as manager or agent as necessary.

Video Signature Curve (VSC) Generation

In some embodiments, the VSCs are generated using the method described in U.S. Pat. No. 6,751,360 titled "Fast video temporal alignment estimation" ("the '360 patent"). A summary of that method is provided below.

First, compute the means of each image or video frame over a block of video frames.

$$m_f := \text{mean}(T_f)$$

where T is an image or video frame, and f is a frame index spanning a block of frames.

Next, compute the co-variance of adjacent frames:

$$SC_f := \left[ \sum_i \sum_j \left[ (T_f)_{i,j} - m_f \right] \cdot \left[ (T_{f-1})_{i,j} - m_{f-1} \right] \right]$$

Next, optionally compute the normalized difference (max-to-min) to determine if there is sufficient AC energy or temporal variation in the VSC for determining alignment to the audio.

$$\text{Diff}_{norm} := \frac{\max(SC) - \min(SC)}{\max(SC)}$$

In other embodiments, the VSCs are generated using an improved method that operates on adjacent frame differences rather than adjacent frames (the "frame differences" method). That improved method is described below.

First, compute a sequence of frame differences:

$$Td_f := T_f - T_{f-1}$$

Next, compute the co-variance of adjacent frame differences:

$$SCd_f := -\left[ \sum_i \sum_j \left[ (Td_f)_{i,j} \right] \cdot \left[ (Td_{f-1})_{i,j} \right] \right]$$

Advantageously, the frame differences method does not require the computation of the means of the frames as does the method described in the '360 patent because the differencing sets the mean to zero. This simplifies the co-variance computation.

Figures 3A, 3B:
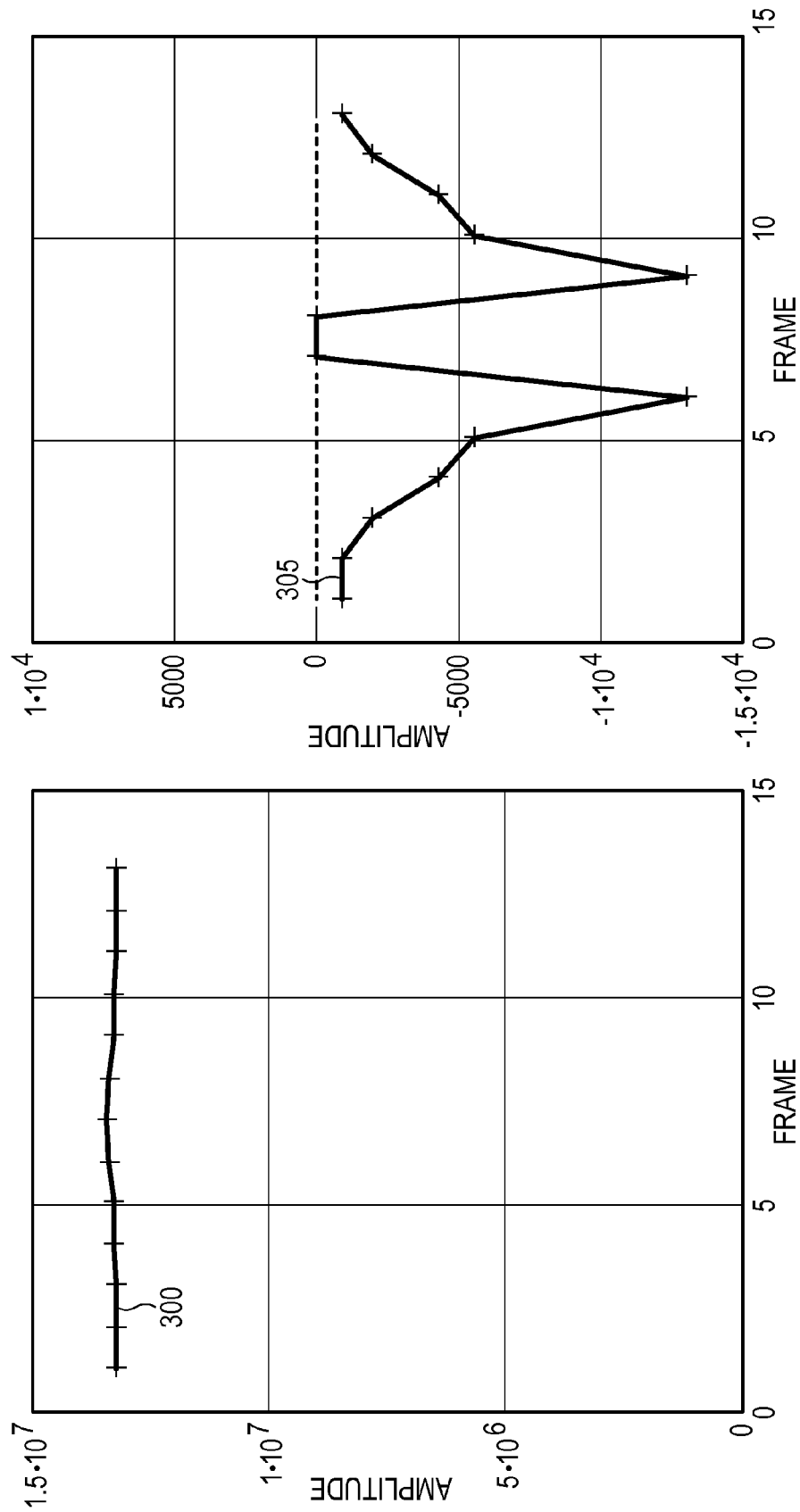
FIG. 3A depicts a video signature curve produced using the method described in U.S. Pat. No. 6,751,360.
FIG. 3B depicts a video signature curve produced using a frame difference method according to an embodiment of the present invention.

FIG. 3A shows a VSC 300 created using the method described in the '360 patent for 13 frames of a talking head video sequence (luminance only). FIG. 3B shows a VSC 305 created using the frame difference method for the same 13 frames. Note that the VSC 305 created using the frame difference method has no offset, making it easier to compress for transmission.

Figure 4:
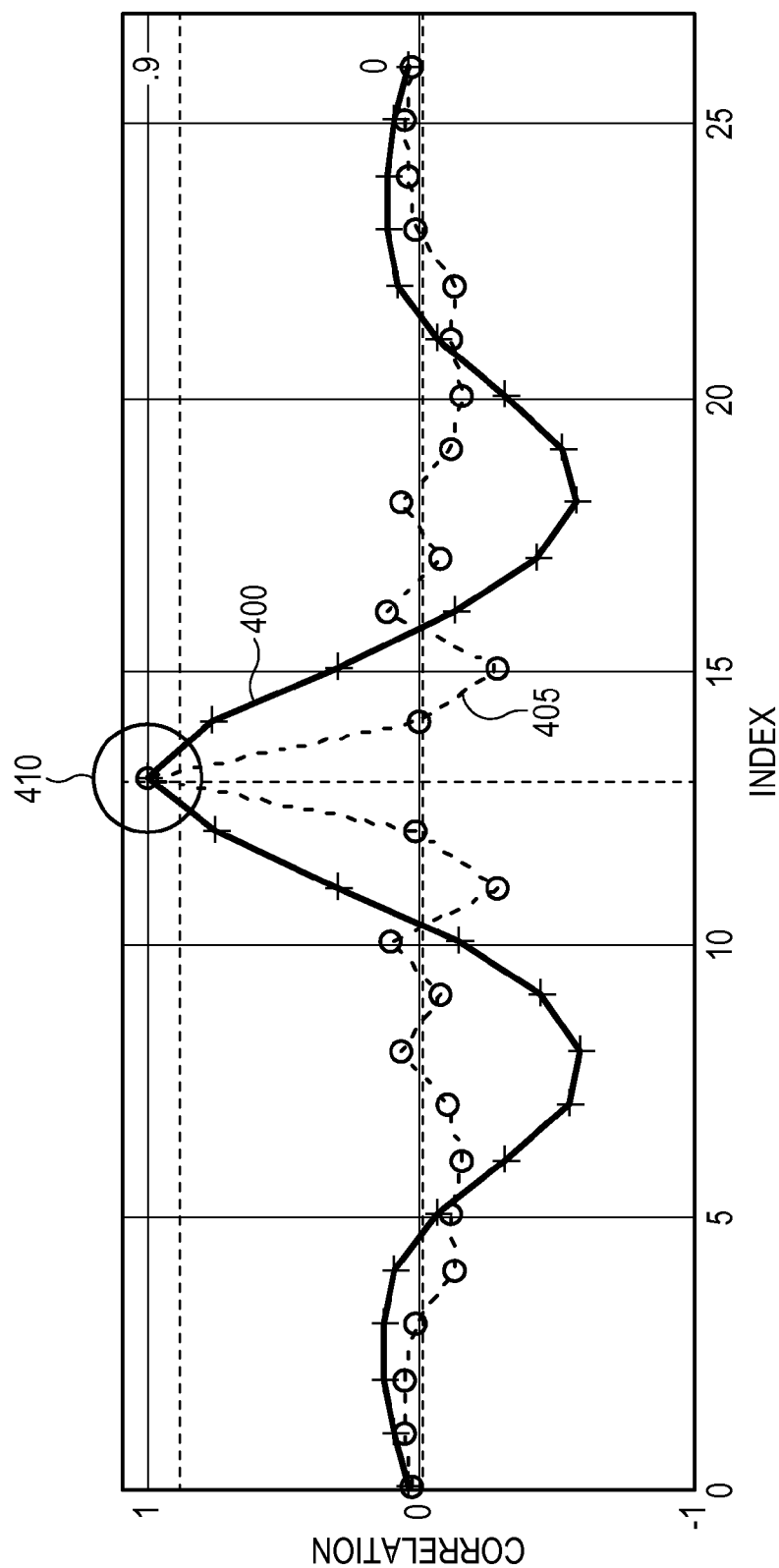
FIG. 4 depicts the cross-correlation of the video signature curve of FIG. 3A with a received replica of itself and the cross-correlation of the video signature curve of FIG. 3B with a received replica of itself.

As described below, during the AV delay determination, a VSCo is cross-correlated with a VSCr to find a point of optimal temporal alignment. FIG. 4 shows a cross-correlation 400 of a VSCo and a VSCr produced using the method of the '360 patent and a cross-correlation 405 of a VSCo and a VSCr produced using the frame difference method. The maximum value 410 at frame 13 indicates that this is the point of optimum temporal alignment between VSCo and VSCr. Note that the method of cross-correlation used to create FIG. 4 is the common Pearson's correlation coefficient computed by normalizing the covariance by the individual standard deviations and the sequence length so as to produce a maximum of unity for convenience. Other methods of performing a cross-correlation of VSCo and VSCr can be used to find the optimum temporal alignment. Note that the cross-correlation 405 produced using the frame difference method is narrower than and has lower side-lobes than the cross-correlation 400 produced using the method of the '360 patent, thereby providing improved time resolution.

An advantage of both methods of generating VSCs is that the program video signal can be heavily compressed, noisy, rotated, scaled, stretched, cropped, contrast/brightness adjusted, or masked with graphics overlays, and the VSCo and VSCr cross-correlation can still be precisely aligned to one frame or less at the destination point.

Audio Signature Curve (ASC) Generation

Figure 5:
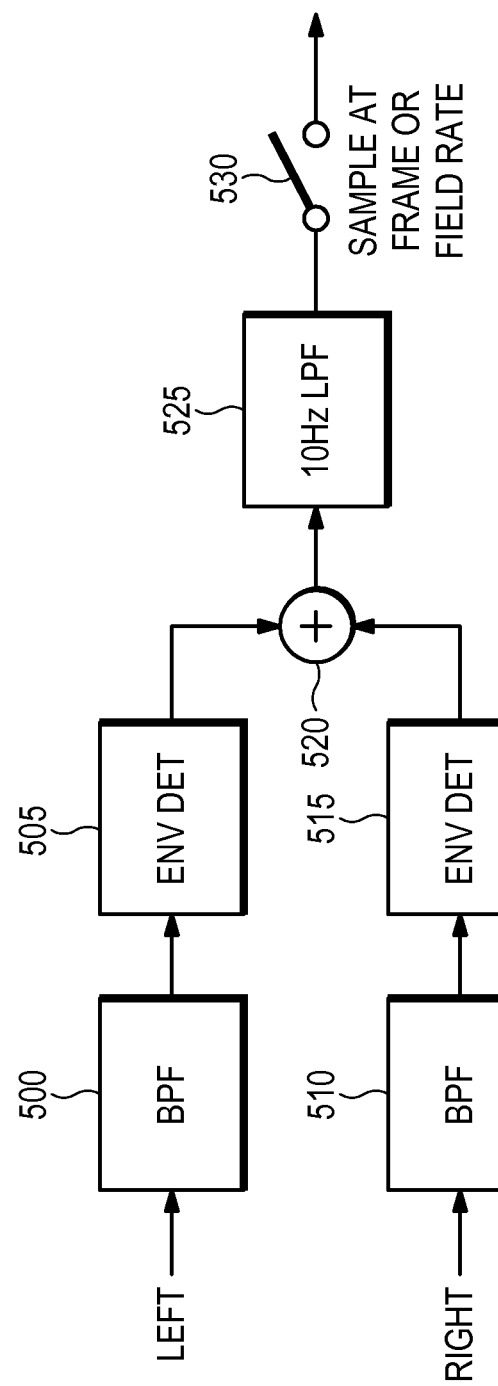
FIG. 5 depicts a system and method of generating an audio signature curve.

FIG. 5 illustrates the system and method for generating ASCs used in the AVDC100. The left channel of an audio signal is filtered with a first band-pass filter 500. The envelope of the filtered left channel is then detected using a first envelope detector 505. Similarly, the right channel of the audio signal is filtered with a second band-pass filter 510. The envelope of the filtered right channel is then detected using a second envelope detector 515. The envelope of the left channel and the envelope of the right channel are then summed together with a summer 520. The resulting sum is then filtered with a 10 Hz low-pass filter 525 and sampled at the frame or field rate with a sampler 530 to produce an ASC.

Figure 6:
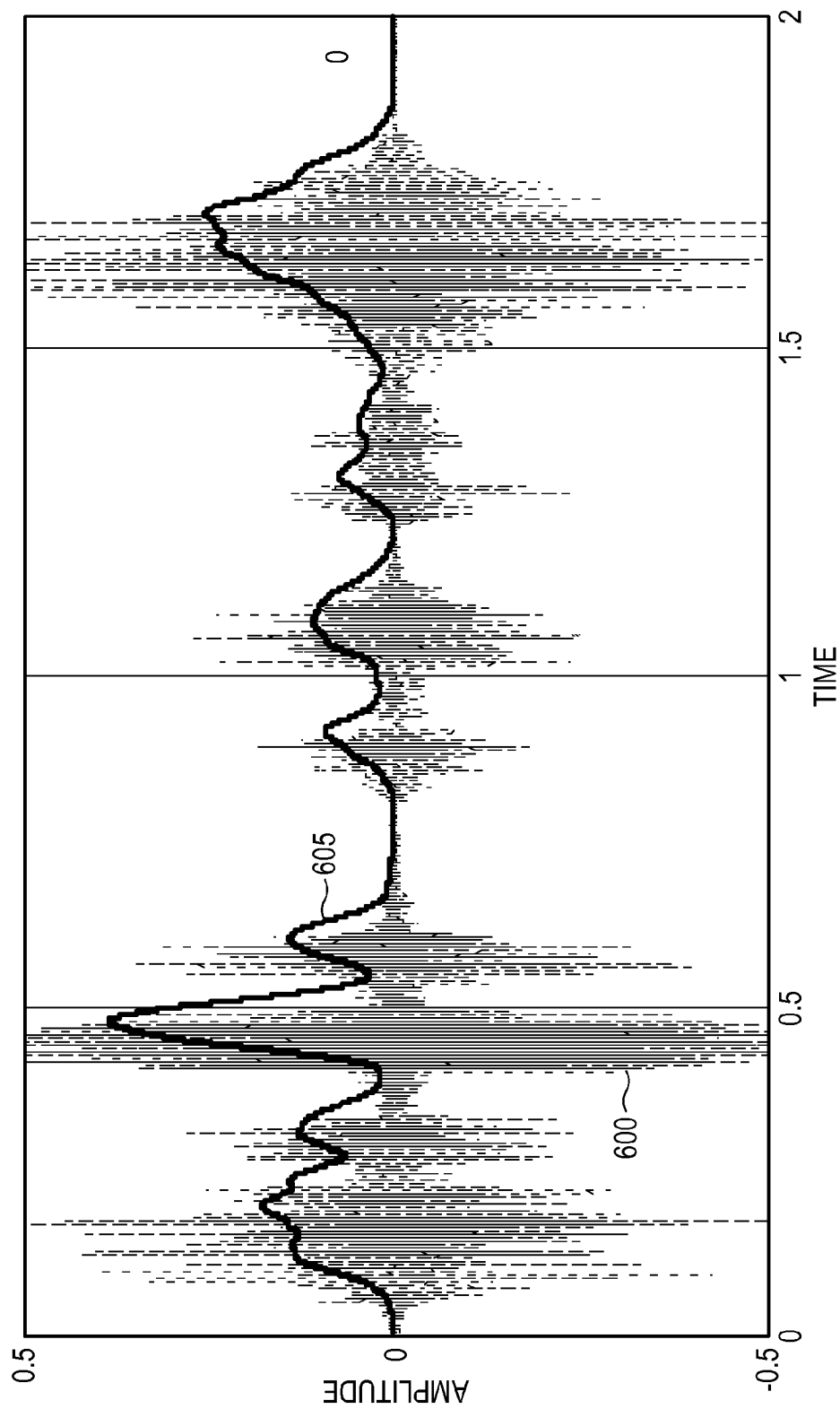
FIG. 6 depicts an audio signal and an audio signature curve generated from it using the system and method of FIG. 5.

FIG. 6 shows a two-second long sample of speech 600 and an ASC 605 derived from it using the system and method described in FIG. 5. Note that the ASC is sampled at the same rate (field or frame) as the VSC.

AV Delay Determination

An agent sets the audio-to-video association for an AV program by storing corresponding ASCs and VSCs as an ordered pair as they are created. The co-sampled AV SCs can then be thought of as a complex number, where the real part corresponds to one component and the imaginary part corresponds to the other component. For example, the real part might correspond to the VSC frame-sample and the imaginary part might correspond to the ASC frame-sample at the same instant in time, or vice versa.

Figure 7:
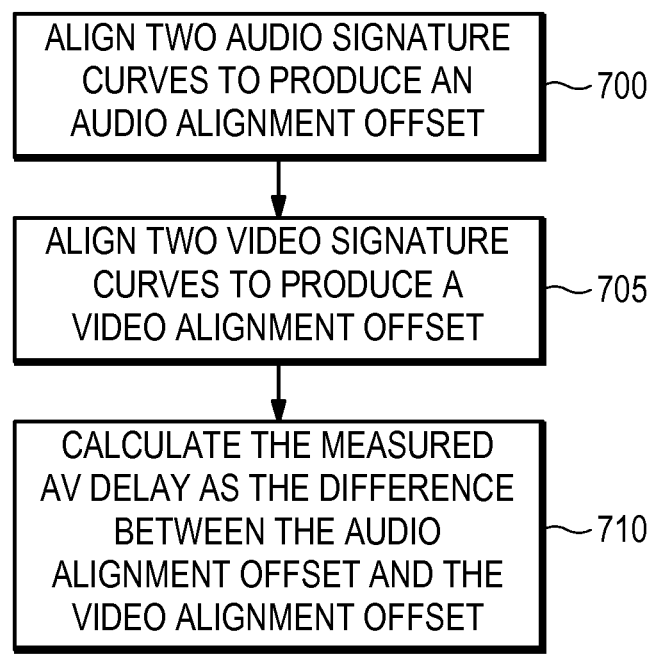
FIG. 7 depicts a method of calculating a measured AV delay.

Referring now to FIG. 7, a manager processes ASCo, VSCo, ASCr, and VSCr to calculate a measured AV delay as follows: First, (700) the manager aligns the received video signal to the distributed video signal ("video-to-video") by cross-correlating VSCr with VSCo and locating the maximum value of the result, the location of the maximum value indicating the point of optimal temporal alignment. The result of the video alignment is a video alignment offset (13 frames in the example above). Next, (705) the manager aligns the received audio signal to the distributed audio signal ("audio-to-audio") by cross-correlating ASCr with ASCo and locating the maximum value of the result, the location of the maximum value indicating the point of optimal temporal alignment. The result of the audio alignment is an audio alignment offset. Finally, (710) the measured AV delay is calculated as the difference (positive or negative) between the video alignment offset and the audio alignment offset. It will be appreciated that the audio-to-audio alignment can be performed before the video-to-video alignment to produce an equivalent result. It will also be appreciated that the AV delay can alternatively be calculated as the difference between the audio alignment offset and the video alignment offset to produce a negative but otherwise equivalent result. In some embodiments, a normalized correlation coefficient is used to remove the effects of received gain errors and audio sweetening affects from the result. Since the AV delay is calculated as a number of frames, the resolution of the AV delay measurement is one frame. Additionally, in some embodiments, the VSCo and VSCr are interpolated to provide sub-frame resolution.

Additional Embodiments

Although the distribution paths 100 and 200 are shown as having only one destination point, a distribution path may also have multiple destination points (i.e., multiple outputs). In those cases, a system may have one agent located at each destination point, with all of the agents being managed by a single manager. A distribution path may also have one or more intermediate points along the distribution path between an origination point and a destination point. In those cases, a system may have an agent located at each intermediate point, in order that AV delay may be measured and corrected at that intermediate point.

In some embodiments, the agents time-stamp the AV paired SCs and store them at the source, labeled as to program ID name. For streaming media, the SCs generated at each display point could be stored and time-stamped or ID-labeled as well.

In some embodiments, the ASCo and VSCo are not captured unless both the audio envelope and the frame difference AC energy exceed a preset threshold. This way, only signatures that can be easily cross-correlated to achieve temporal alignment are sent. (Note that if the AC energy is low, then there is no need to adjust lip-sync anyway because there is no video motion or plosive audio.)

In some embodiments, the signature curves are time-stamped and stored for a long period of time (minutes or even hours) to allow the correlations to be done even if the delay of the distribution path is very long.

In some embodiments, when poor correlation occurs, the corrective AV delay correction value could be set to dwell for a predetermined time and return to a predetermined pre-set value. The computed AV delay could also be filtered (median and mean) to remove spurious values before it is used to correct the AV delay.

In some embodiments, in addition to time-stamping the SCs, other metadata for material ID can be sent to the manager or agents.

If the cross-correlation of the SCs consistently never gets close to one for any offset, then the received audio or video may be the wrong program. Accordingly, in some embodiments, content identification and program play-out verification is also provided and monitored via the separate data path.

In some embodiments, AV delay measurements and correction values can be remotely monitored and delay correction values can be manually over-ridden by the manager.

In some embodiments, SNMP data can be coded for authentication and made private so as to prevent unauthorized use or tampering.

The agents and managers described herein are described as having a processor. It will be understood that this processor may be implemented in hardware, software, or a combination of the two, and may comprise and/or be executed on a general purpose microprocessor, a digital signal processor (DSP), an application specific integrated circuit (ASIC), a field-programmable gate array (FPGA), or the like.

It will be appreciated from the foregoing discussion that the present invention represents a significant advance in the field of video test and measurement instruments. Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. A device comprising:
    an input for receiving an audio/video (AV) program at a point along a distribution path, the AV program having an audio signal and a video signal; and
    a processor for processing the audio signal to generate an audio signature curve, and for processing the video signal to generate a video signature curve;
    wherein the processor comprises:
    a first band-pass filter for filtering a left channel of the audio signal to produce a filtered left channel;
    a first envelope detector for detecting an envelope of the filtered left channel;
    a second band-pass filter for filtering a right channel of the audio signal to produce a filtered right channel;
    a second envelope detector for detecting an envelope of the filtered right channel;
    a summer for summing the envelope of the filtered left channel and the envelope of the envelope of the filtered right channel to produce a sum;
    a low-pass filter for filtering the sum to produce a filtered sum; and
    a sampler for sampling the filtered sum at the frame or field rate to produce the audio signature curve.

2. A device as in claim 1 further comprising an output for distributing the audio signature curve and the video signature curve via a separate data path other than the distribution path.

3. A device as in claim 1 wherein the processor comprises means for generating the video signature curve based on a co-variance of adjacent frames of the video signal.

4. A device as in claim 1 wherein the processor comprises means for generating the video signature curve based on a co-variance of adjacent frame differences of the video signal.

5. A method comprising the steps of:
    receiving an audio/video (AV) program at a point along a distribution path, the AV program having an audio signal and a video signal; and
    generating an audio signature curve based on the audio signal, and a video signature curve based on the video signal;
    wherein the audio signature curve is generated by:
    filtering a left channel of the audio signal to produce a filtered left channel;
    detecting an envelope of the filtered left channel;
    filtering a right channel of the audio signal to produce a filtered right channel;
    detecting an envelope of the filtered right channel;
    summing the envelope of the filtered left channel and the envelope of the envelope of the filtered right channel to produce a sum;
    filtering the sum to produce a filtered sum; and
    sampling the filtered sum at the frame or field rate to produce the audio signature curve.

6. A method as in claim 5 further comprising the step of distributing the audio signature curve and the video signature curve via a separate data path other than the distribution path.

7. A method as in claim 5 wherein the video signature curve is generated based on a co-variance of adjacent frames of the video signal.

8. A method as in claim 5 wherein the video signature curve is generated based on a co-variance of adjacent frame differences of the video signal.

* * * * *